(12) United States Patent
Hofmann

(10) Patent No.: US 6,210,282 B1
(45) Date of Patent: Apr. 3, 2001

(54) OUTER PART OF A CONSTANT VELOCITY UNIVERSAL JOINT

(75) Inventor: Norbert Hofmann, Ronneburg (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/049,326

(22) Filed: Mar. 27, 1998

(30) Foreign Application Priority Data

Apr. 2, 1997 (DE) ............................................. 197 13 597

(51) Int. Cl.$^7$ ............................................................. F16D 3/26
(52) U.S. Cl. ............................................. 464/170; 464/905
(58) Field of Search .......................... 464/98, 111, 170, 464/905, 906, 904; 228/174; 403/270, 271, 371, 372

(56) References Cited

U.S. PATENT DOCUMENTS

| | | | |
|---|---|---|---|
| 4,523,916 | * 6/1985 | Kizler et al. | 464/98 |
| 5,279,522 | * 1/1994 | Rouillot et al. | 464/111 |
| 5,407,296 | * 4/1995 | Brown | 403/371 X |
| 5,676,599 | 10/1997 | Ricks et al. | |
| 5,857,800 | * 1/1999 | Nell | 403/271 X |

FOREIGN PATENT DOCUMENTS

| | | |
|---|---|---|
| 4314503 | 12/1994 | (DE) . |
| 2200722 | 8/1988 | (GB) . |
| 9116550 | 10/1991 | (WO) . |

* cited by examiner

Primary Examiner—Lynne H. Browne
Assistant Examiner—Greg Binda

(57) ABSTRACT

An outer joint part of a constant velocity universal joint comprises an externally cylindrical casing part. An inside is provided with tracks to allow the engagement of torque transmitting elements, and which further comprises a substantially annular flange part which is provided with a central inner recess and which is slid on to the casing part and connected thereto, as well as circumferentially distributed fixing holes for threading on a counter flange. The flange part comprises circumferentially distributed, individual, separate fixing portions which receive the fixing holes, and connecting portions which connect the fixing portions and have a greater flexibility than said fixing portions.

7 Claims, 8 Drawing Sheets

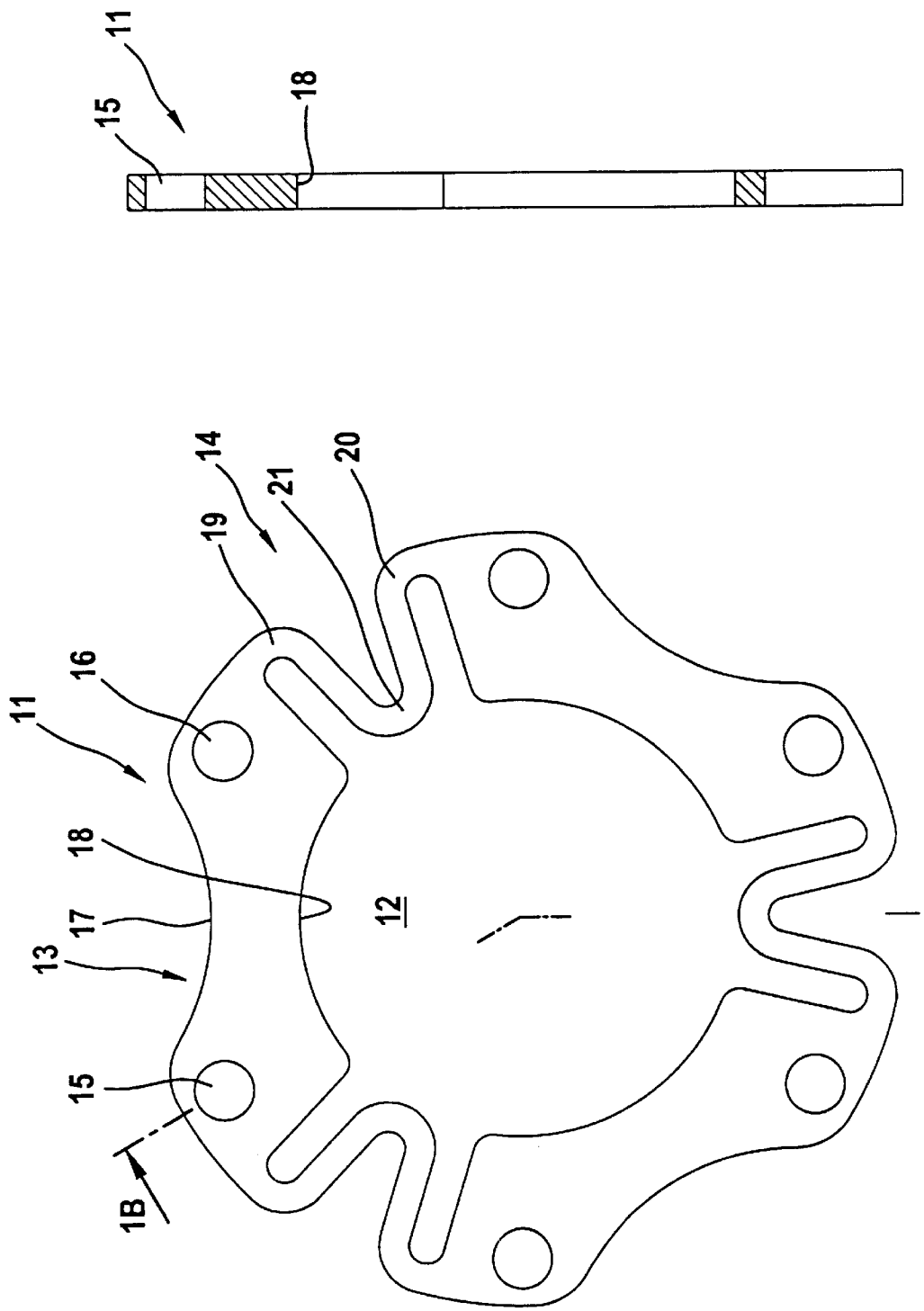

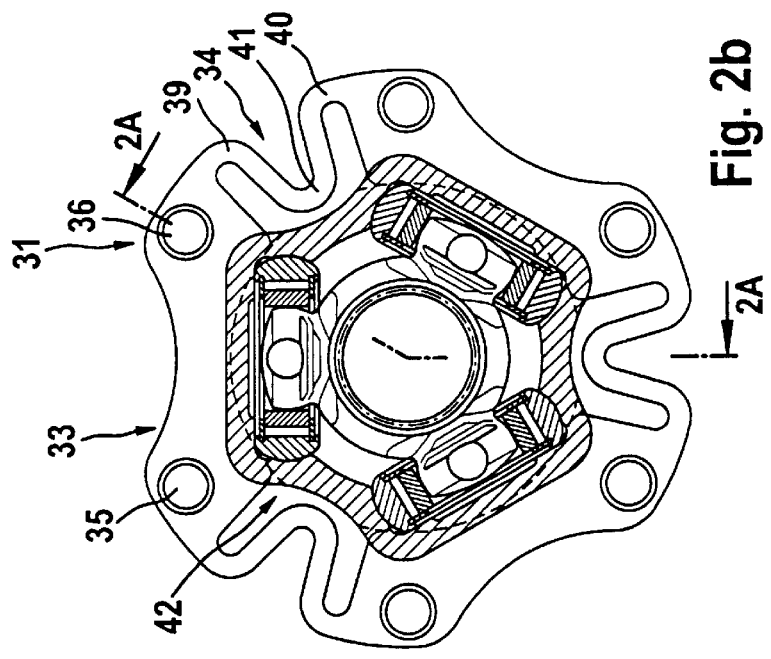
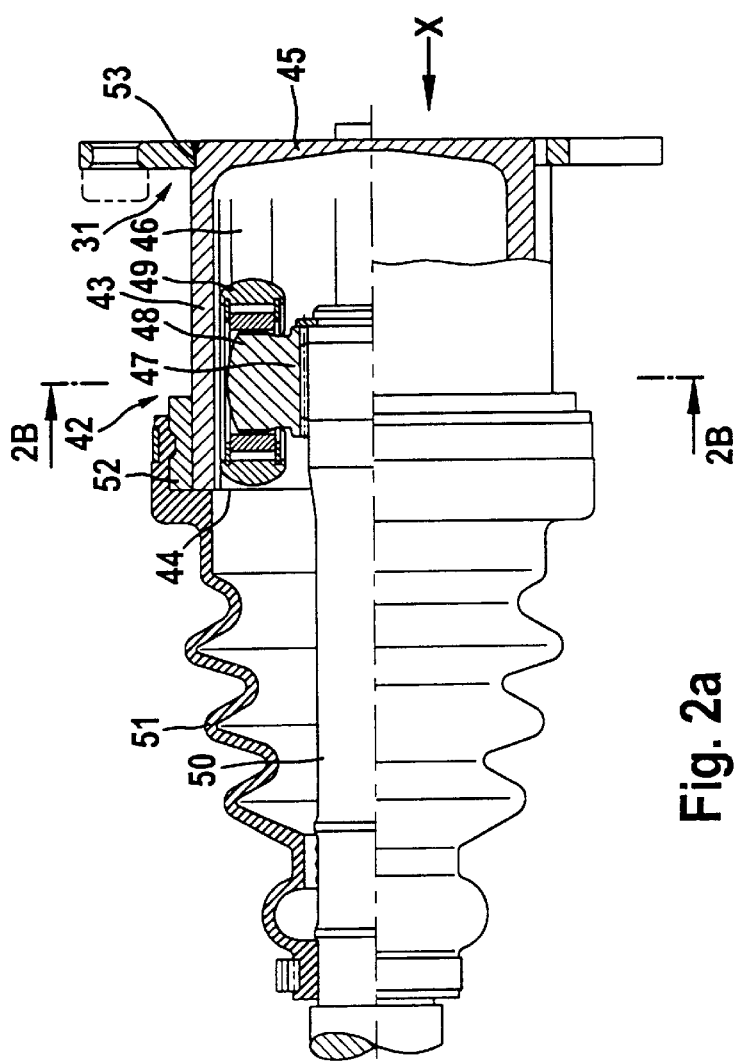
Fig. 2b
Fig. 2a

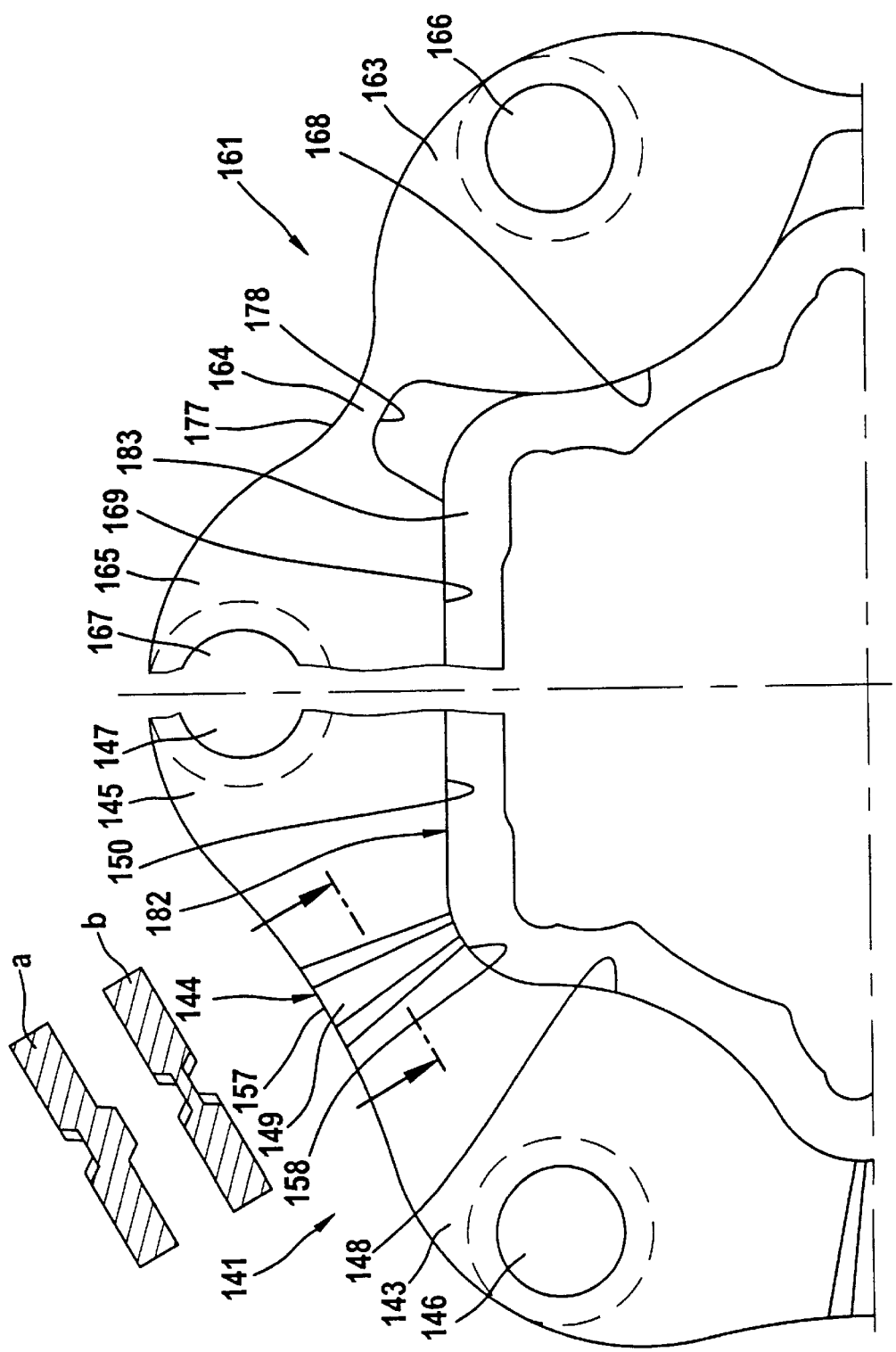

OUTER PART OF A CONSTANT VELOCITY UNIVERSAL JOINT

BACKGROUND OF THE INVENTION

The invention relates to an outer joint part of a constant velocity universal joint which comprises an externally cylindrical casing part whose inside is provided with tracks to allow the engagement of torque transmitting elements, and which further comprises a substantially annular flange part which is provided with a central inner recess and which is slid on to the casing part and connected thereto, as well as provided with circumferentially distributed fixing holes for threading on a counter flange.

An outer joint part of this type is known from DE 43 14 503 C1. Between fixing portions having circular-arc-shaped outer edges, there are provided concave connecting portions and which have a smaller radial dimension than the fixing portions. The casing part and flange part are joined by a continuous weld.

In the attempt to save weight, outer joint parts of the above-mentioned type become more and more thin-walled. In some cases, outer joint parts which used to be exclusively forgings or hot-formed parts are now produced from plate metal by cold forming processes.

Even if a suitable material is selected, such thin-walled outer joint parts are easily deformable. One of the main objectives of modern forming processes consists in finish-producing the guiding tracks of the outer joint parts in the course of the forming operation which, at most, are followed by surface treatment processes.

This method is risky in that during subsequent assembly of the flange parts, the casing part of the outer joint part may be subject to deformation resulting in inaccuracies in the previously accurately produced guiding tracks. The measures of providing increased accuracy in producing the flange parts or of machining the seat faces for the flange parts at the casing part, which would prevent this deformation, are undesirable because of the additional costs.

It is therefore the object of the present invention to provide an outer joint part of the initially mentioned type which makes use of the advantages of a cost-effective production process without allowing any defects in the dimensional accuracy of the guiding tracks during the assembly of the casing part and flange part.

SUMMARY OF THE INVENTION

The solutions proposed to achieve the above objective are all characterized in that the flange part comprises circumferentially distributed, individual, separate fixing portions which receive the fixing holes, and connecting portions which connect the fixing portions and have a greater flexibility than the fixing portions. Furthermore, according to a first embodiment, it is only in the region of the fixing portions where the flange part is welded to the casing part. According to a second embodiment, the connecting portions are provided with apertures or slots. According to a third embodiment, the connecting portions comprise parts whose wall thickness is reduced as compared to that of the fixing portions. According to a fourth embodiment, the connecting portions comprise folds which project from the plane of the fixing portions. In the case of the second and further embodiment, the flange part can be continuously welded to the casing part.

These methods make it possible to fully utilize the scope available for the lightweight construction of the casing part in respect of the strength values required in operation, and at the same time to ease the requirements in respect of production accuracy, shape of the flange part and production of the respective seat face at the casing part. Even if the conditions of fit are inaccurate, assembly is possible without any distortion occurring in the casing part. The inaccuracies are compensated for by deformations in the regions of the connecting portions. Even with relatively large production tolerances, classification of the casing parts and flange parts is not required. By connecting the casing part and flange part, the casing part acquires the stiffness needed in operation. After the flange part has been slid on to the casing part, the connecting portions, in the case of press fits, are able to reduce forces as a result of their flexibility and, in particular, to bias non-uniform forces by means of deformation.

The dimensions of the connecting portions can be reduced in such a way that they can be regarded entirely as means for connecting the individual fixing regions to one another, in order to facilitate assembly. The individual fixing regions are stiffened relative to one another by being welded to the casing part and by being fixed to a sufficiently stable counter-flange.

To reduce the forces during press-fit assembly, knobs are preferably provided in the inner recess of the flange part, which knobs project inwardly beyond a continuous contour, or to provide knobs at the casing part in the region of the seat face for the flange part, which knobs project beyond a continuous outer contour. Such knobs are more easily deformable than the connecting portions, so that part of the forces or peak forces occurring during assembly are reduced immediately. The gap existing between the contact points in the regions of the knobs is preferably closed by a weld. The knob height is preferably small enough to allow the gap to be closed by laser welding.

Special embodiments of the connecting portions are described in the sub-claims to whose contents reference is made hereby. In particular, reference is made to the special description of the drawing. The fixing portions may preferably comprise one or two fixing holes each. In a preferred embodiment, there should be provided three or more fixing portions.

BRIEF DESCRIPTION OF THE DRAWINGS

FIG. 1 shows the flange of an inventive outer joint part in the form of a detail,
 a) in a plan view
 b) in a longitudinal section according to sectional line 1b—1b of of FIG. 1a.
FIG. 2 shows a tripode joint with an inventive outer joint part in a first embodiment
 a) in a longitudinal section according to sectional line 2A—2A of FIG. 2b
 b) in a cross-section according to sectional line 2B—2B of FIG. 2a
 c) in a view "X" according to FIG. 2a.
FIG. 3 shows an inventive outer part of a tripode joint in a second embodiment,
 a) in a longitudinal section according to sectional line 3A—3A of FIG. 3b
 b) in a view "Y" according to FIG. 3a.
FIG. 5 shows an inventive outer joint part in half a section

Figure 2C:
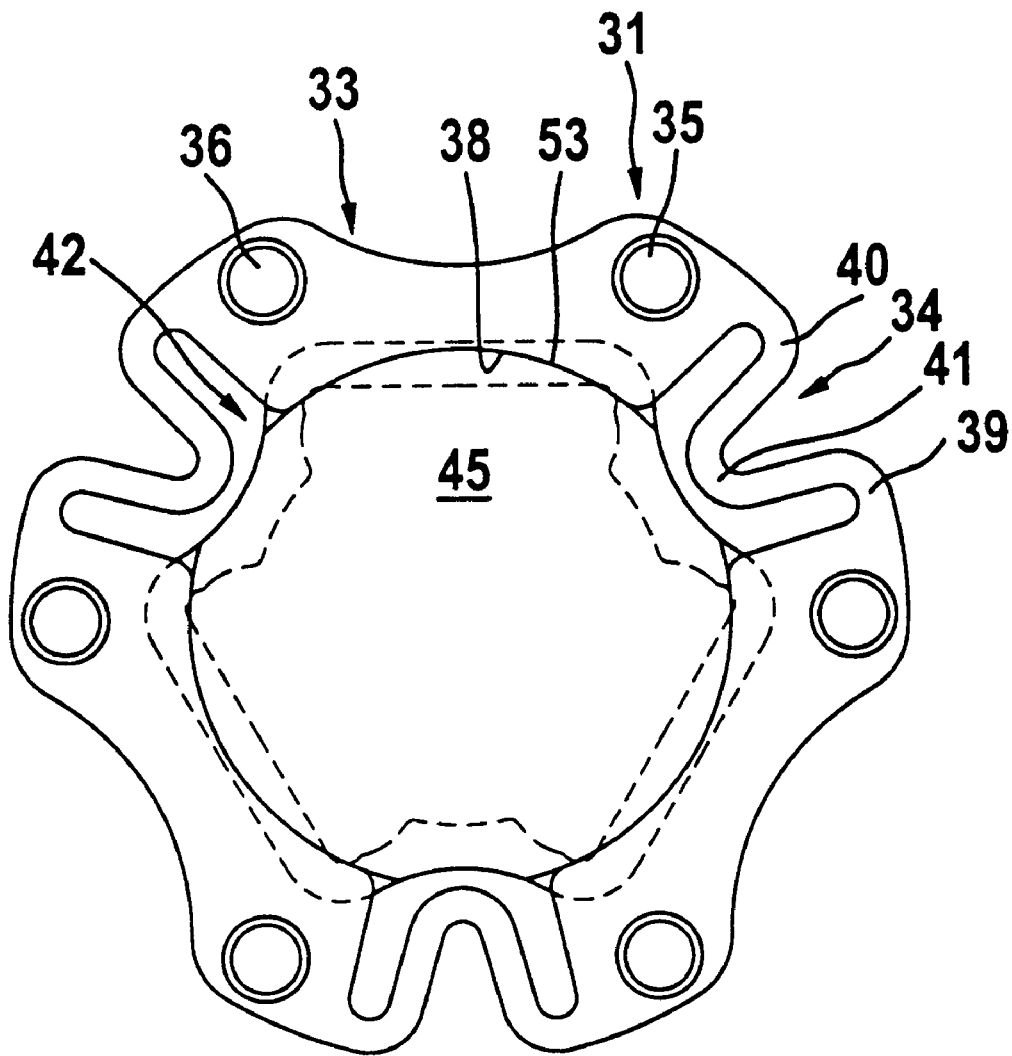

*a*) with a flange in a fifth embodiment in a quarter view,

*b*) with a flange in a sixth embodiment in a quarter view.

FIG. 6 shows an inventive outer joint part in half a section,

*a*) with a flange in a seventh embodiment in a quarter view,

*b*) with a flange according to FIG. 1 in quarter view.

FIG. 7 shows an inventive outer joint part in half a section,

*a*) combined with a flange pre-mounted so as to define a gap, with knobs provided at the flange,

*b*) combined with a flange pre-mounted so as to define a gap, with knobs provided at the joint part.

DETAILED DESCRIPTION

FIGS. 1*a* and 1*b* show a substantially annular flange part 11 which, substantially, is cut out of a planar piece of plate metal with a constant thickness. The flange part 11 comprises a substantially round inner recess 12 into which it is possible to insert a casing part of an inventive outer joint part. It can be seen that the flange part is provided with three circumferentially distributed fixing portions 13 of greater strength which extend radially by approximately the same amount, and with three connecting portions 14 whose strength is considerably reduced due to their web-like shape. The fixing portions are provided with two fixing holes 15, 16 each. Between the two holes they comprise an outer indentation 17 which, however, does not greatly reduce the strength of the fixing portions 13 between the fixing holes 15, 16. On their insides, the fixing portions are provided with a circular-arc-shaped fixing edge 18. The connecting portions 14, on their radial outsides, adjoin the neighboring fixing portions 13 by means of tabs 19, 20 and, while retaining their width, form an inwardly opening U-shaped web 21. In accordance with the invention, the connecting portions 14, on their insides, are contact-free relative to a casing part inserted into the inner recess 12 and are not permanently connected to same, whereas the fixing portions 13 are welded along the circular fixing edges 18 to the inserted casing part. As a result of the increase in flexibility, any fit inaccuracies occurring when sliding the flange part on to the casing part can be compensated for within the connecting portions 14 without adversely affecting the casing part. The flange part 11 shown here is provided for an externally circular-cylindrical casing part, such as they are particularly common in constant velocity ball joints. However, said flange part 11 can also be used for casing parts which, on their outsides, only comprise a circular-cylindrical turned recess, at least in the region of their bases, especially casing parts for tripode joints.

FIGS. 2*a*, 2*b*, 2*c* and 2*d* show a complete tripode joint whose outer part consists of a casing part 42 and a flange part 31, with the latter corresponding to the flange part 11 according to FIGS 1*a* and 1*b*. The casing part 42 comprises a cylindrical portion 43 and, at one end, is provided with an aperture 44 whereas at the other end it is closed by a base 45. While having an approximately constant wall thickness, the cylindrical portion comprises a clover-leaf-like circumferential line for the purpose of forming three guiding tracks 46. The inner joint part consists of a tripode 47 with three tripode arms 48 and roller assemblies 49 held thereon. A plug-in shaft 50 is inserted into the tripode 47 and axially secured thereto. The aperture 44 of the casing part 42 is sealed towards the outside by a convoluted boot 51, and on to the casing part 42 there is placed a compensating element 52 which, on its inside, adapts itself to the contour of the cylindrical portion 43 and, on its outside, has a circular cross-section for the purpose of securing the convoluted boot. The flange part 31 is similar in design to that shown in FIGS. 1*a* and 1*b* and comprises three fixing portions 33 each having two fixing holes 35, 36, as well as three connecting portions 34 with connecting tabs 39, 40 and a U-shaped web 41. The inner fixing edges 38 which embrace the cylindrical portion 43 in portions, are arranged on an outer recess 53 in the base 45, which recess has a circular cross-section in the seat region. The U-shaped webs 41 are arranged at a radial distance from the portions of the casing part 42 positioned between the guiding grooves 46.

Figure 3B:
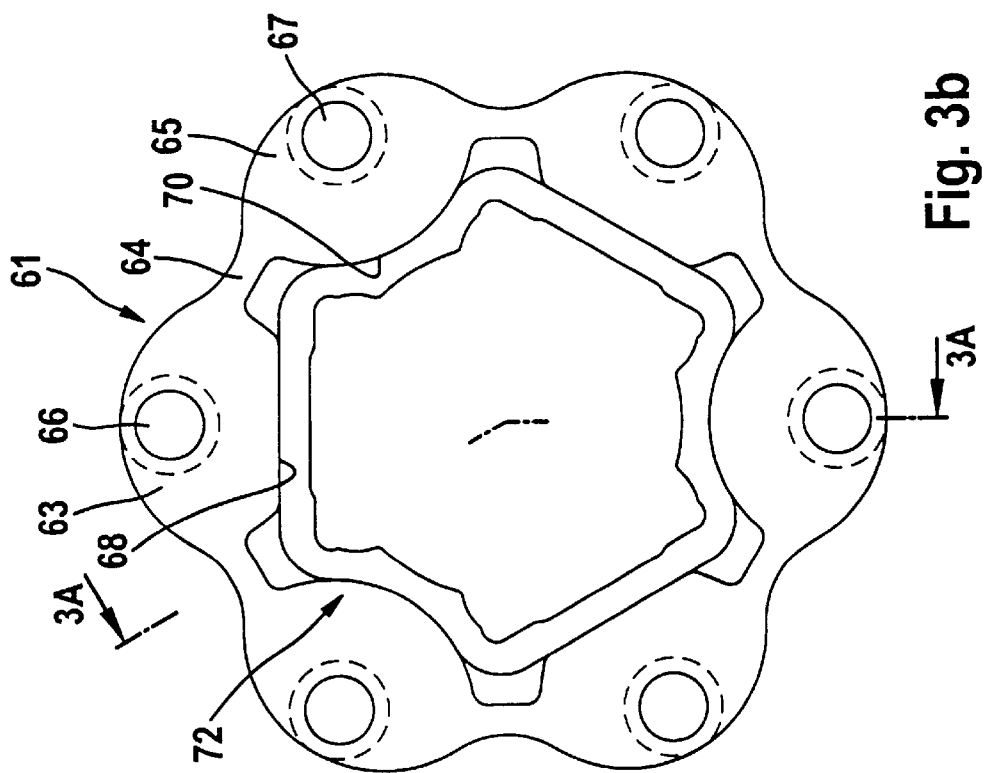
Figure 3A:
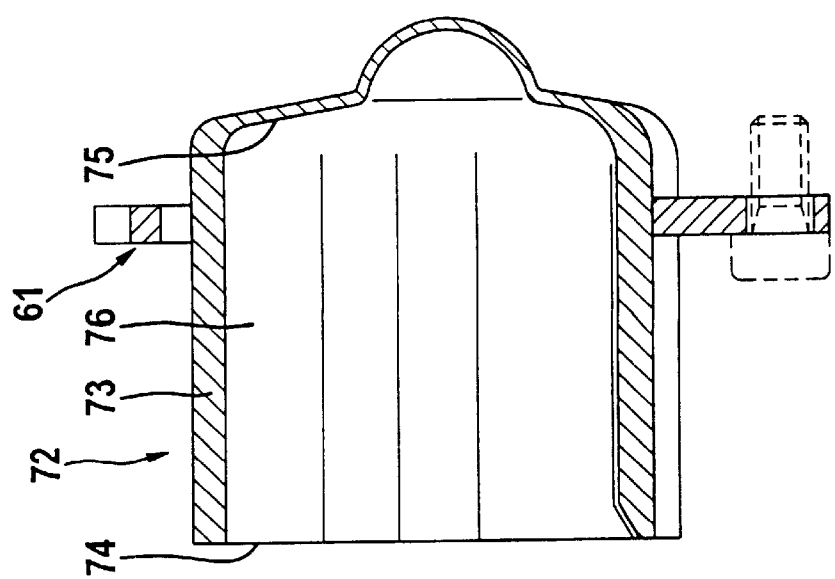

FIGS. 3*a* and 3*b* show an inventive outer joint part consisting of a casing part 72 and a flange part 61. The casing part 72 comprises a cylindrical portion 73 with an aperture 74 and is closed by the base part 75 which, while having a reduced wall thickness, is spherical in shape in its center. In this embodiment, the flange part 61 comprises a total of six fixing portions 63, 65 and six connecting portions 64 connecting the fixing portions. The fixing portions 63, 65 each comprise only one centrally arranged fixing hole 66, 67. The fixing portions 63, 65 differ from one another in respect of the shape of their fixing edges 68, 70 which are in contact with differently formed parts of the clover-leaf-shaped cylindrical portion 73, so that the flange part 61 is secured against rotation on the casing part 72. The connecting portions 64 are provided in the form of simple circumferential webs of a small radial thickness and arranged at a distance from the casing part 72.

Figures 4A, 4B:
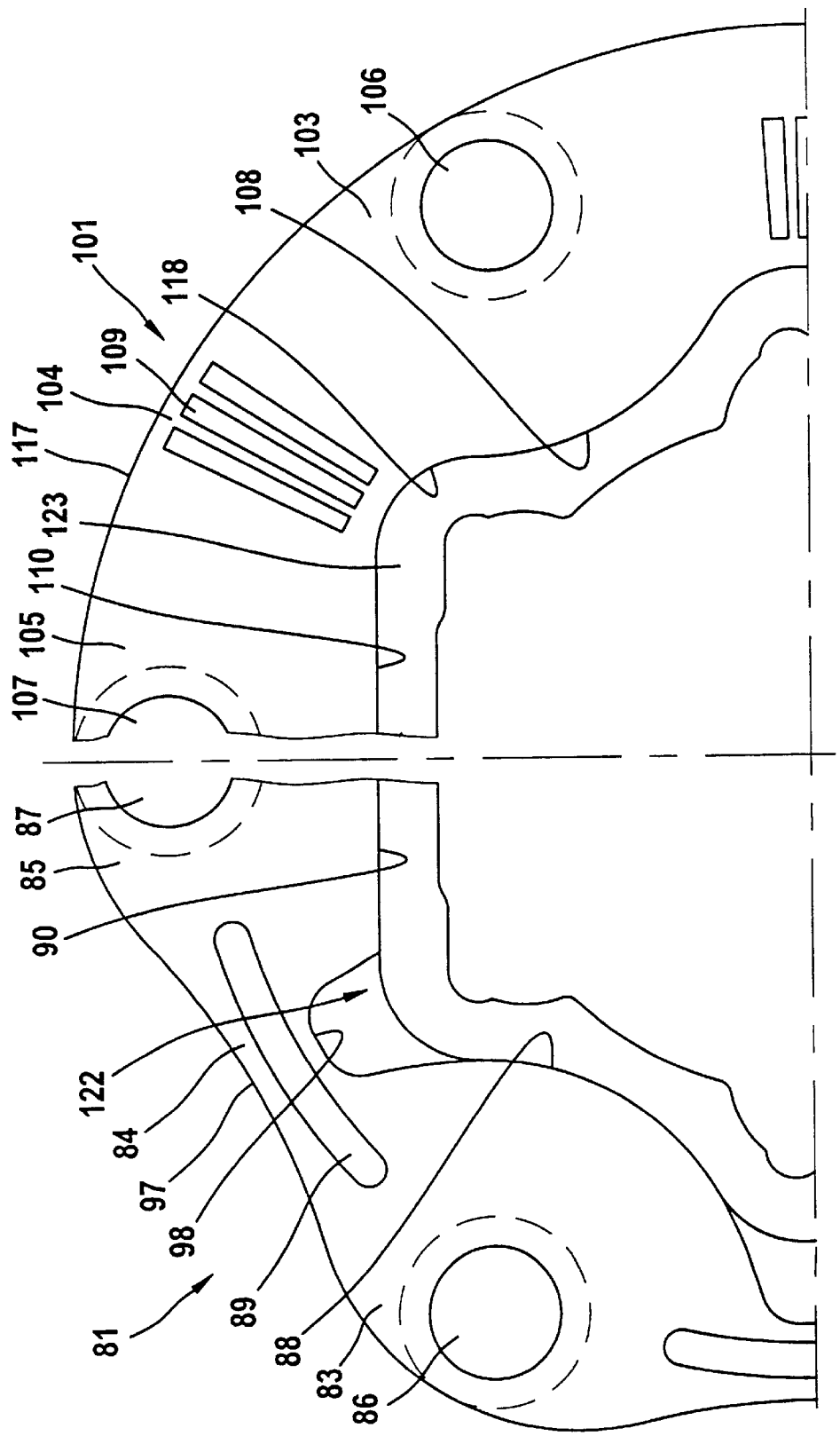
FIG. 4 shows an inventive outer joint part in half a section,
 a) with a flange in a third embodiment in a quarter view,
 b) with a flange in a fourth embodiment in a quarter view.

In FIGS. 4*a* and 4*b*, a fourth flange part 81 and a fifth flange part 101 are each shown in a quarter view and arranged on a casing part 122.

The flange part 81 in FIG. 4*a* is shown to be provided with two fixing portions 83, 85 which each comprise a centrally arranged fixing hole 86, 87. The connecting portion 84 connecting the two fixing portions is provided in the form of a circumferentially extending narrow web which is arranged at a radial distance from the cylindrical portion 123 of the casing part 122 whose flexibility, furthermore, is reduced by a circumferential slot 89 which projects into the fixing portions 83, 85 and extends on a circular arc relative to the flange center. The shape of the connecting portion 84 is determined by the outer indentation 97 and an inner recess 98. The shape of the fixing edges 88, 90 is adapted to the outer contour of the cylindrical portion 123, so that the flange part 81, in the direction of rotation, is form-fittingly secured on the casing part 122.

The flange part 101 in FIG. 4*b* is shown to comprise two fixing portions 103, 105 which each comprise a centrally arranged fixing hole 106, 107. The shape of the connecting portion 104 connecting the two fixing portions is defined by an outer circular edge 117 and inner adapting means 118 relative to the cylindrical portion 123 of the casing part 122, with the flexibility of the connecting portion 104 being reduced only by three radial slots 109 which are located between the fixing portions 103, 105 and are aligned radially relative to the flange center. The shape of the fixing edges 108, 110 is adapted to the outer contour of the cylindrical portion 123, so that, in the direction of rotation, the flange part is form-fittingly secured on the casing part 122.

FIGS. 5*a* and 5*b* shows a quarter illustration of the sixth flange part 141 and of the seventh flange part 161, both arranged on a casing part 182. The flange part 161 corresponds to the flange part 61 according to FIG. 3*b*.

The flange part 141 in FIG. 5*a* is shown to comprise two fixing portions 143, 145 which each comprise a centrally arranged fixing hole 146, 147. The shape of the connecting portion 144 connecting the two fixing portions is defined by an outer indentation 157 and inner adapting means relative to the cylindrical portion 183 of the casing part 182, with the flexibility of the connecting portion 144 being reduced only by radial grooves 149 which are located between the fixing portions 143, 145 and are aligned radially relative to the flange center. The shape of the fixing edges 148, 150 is adapted to the outer contour of the cylindrical portion 183, so that, in the direction of rotation, the flange part is form-fittingly secured to the casing part 182. In a sectional view, the radial grooves are shown in two embodiments. According to the first detail a, the radial groove is achieved by a stamped protrusion on one side and according to the second detail b, by stamped impressions on both sides.

The flange part 161 in FIG. 5b is shown to comprise two fixing portions 163, 165 which each comprise a centrally arranged fixing hole 166,157. The connecting portion 164 connecting the two fixing portions is provided in the form of a circumferentially extending narrow web arranged at a radial distance from the cylindrical portion 183 of the casing part 182, with the flexibility of the connecting portion 164 being reduced exclusively by its shape. The shape of the connecting portion is determined by an outer indentation 177 and an inner recess 178. The shape of the fixing edges 168, 170 is adapted to the outer contour of the cylindrical portion 183, so that, in the direction of rotation, the flange part 161 is form-fittingly secured to the casing part 182.

Figures 6A, 6B:
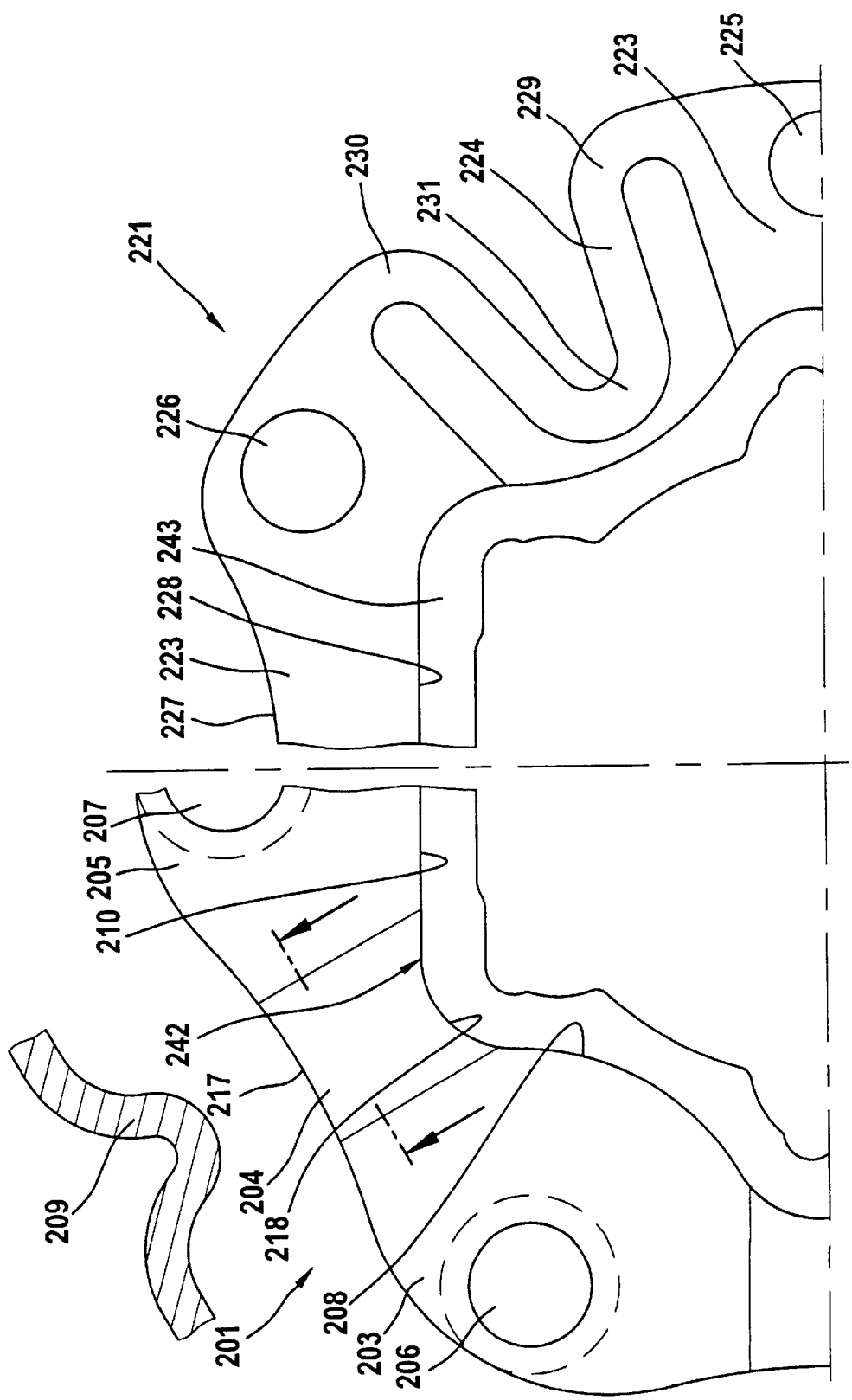

FIGS. 6a and 6b show a quarter illustration of an eighth flange part 201 and of a ninth flange part 211, both arranged on a casing part 242. The flange part 221 corresponds to the flange parts 11, 31 according to FIGS. 1a and 1b and 2a and 2b.

The flange part 201 in FIG. 6a is shown to comprise two fixing portions 203, 205 which are each provided with a central fixing hole 206, 207. The connecting portion 204 connecting the two fixing portions is provided in the form of a web whose width is reduced and which is provided with an outer indentation 217 and inner adapting means 218 relative to the cylindrical portion 243 of the casing part 242, with the flexibility of the connecting portion 204 being reduced by the expansion fold 209 which is located between the fixing portions and which is aligned relative to the flange center. The shape of the fixing edges 208, 210 is adapted to the outer contour of the cylindrical portion 243, so that, in the direction of rotation, the flange part 201 is form-fittingly secured to the casing part 242. The sectional view, in the form of a detail, shows an embodiment of the expansion fold 209 in an enlarged scale.

The flange part 221 according to FIG. 6b is provided with two fixing portions 223 of an increased strength and with one connecting portion 224 whose strength is reduced considerably due to being provided in the form of a web. The fixing portions 223 are each provided with two fixing holes 225, 226 one of which is shown in each case. They each comprise an outer indentation 227 which, however, does not greatly reduce the strength of the fixing portions 223 between the fixing holes 225, 226. On their insides, the fixing portions are provided with a fixing edge 228 which is adapted to the casing part 243. On its radial outside, the connecting portion 224, by means of tabs 229, 230, adjoins the neighboring fixing portions 223 and, while retaining a constant width, forms an outwardly opening U-shaped web 231.

Figures 7A, 7B:
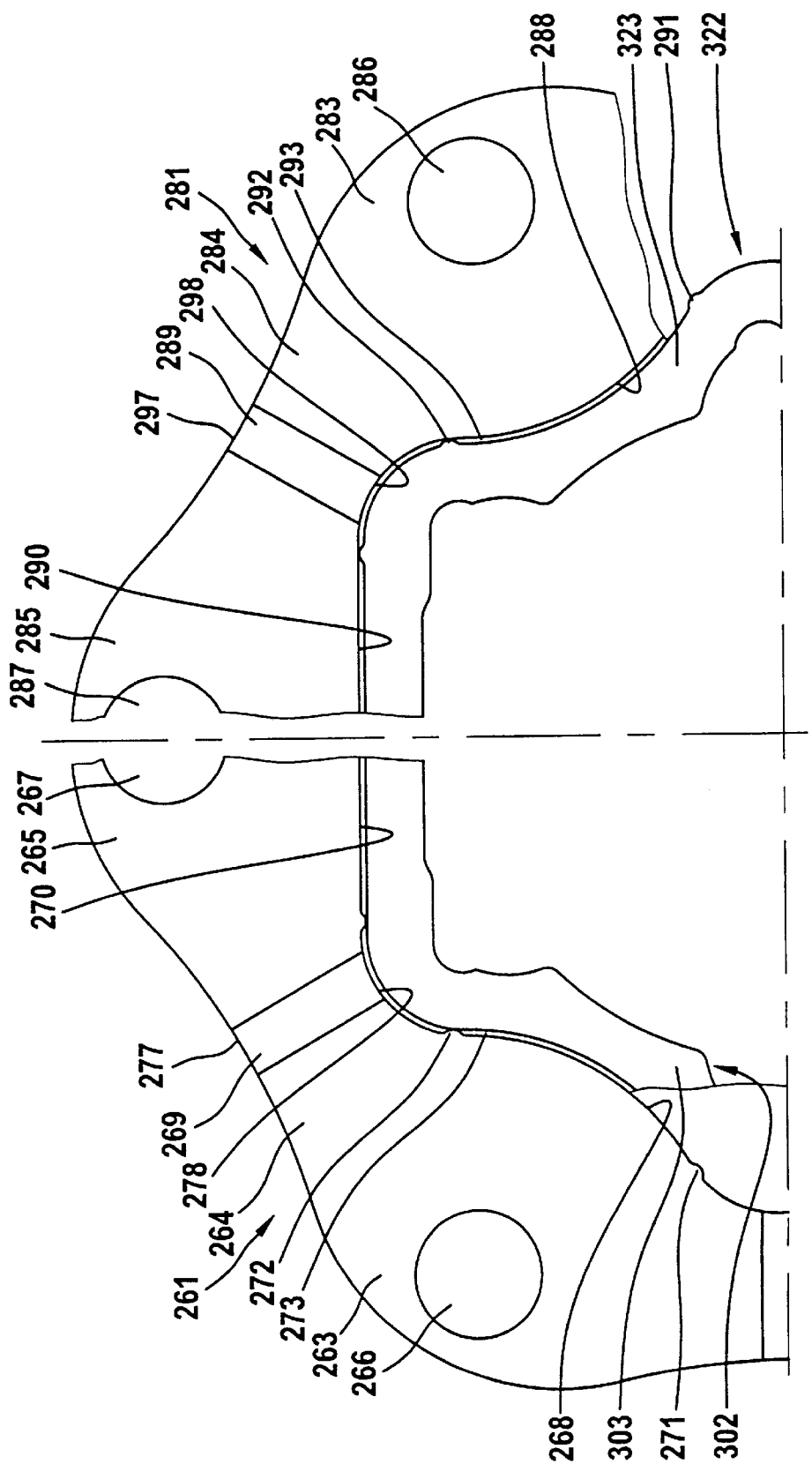

FIGS. 7a and 7b show a quarter illustration of a tenth flange part 261 and an eleventh flange part 281 which substantially correspond to the flange parts 141 and 201 in FIGS. 5a and 6a and are slid on to associated casing part portions 302, 322.

The flange part 261 in FIG. 7a is shown to comprise two fixing portions 263, 265 which are each provided with a central fixing hole 266, 267. The shape of the connecting portion 264 connecting the two fixing portions is defined by an outer indentation 277 and inner adapting means 278 relative to the cylindrical portion 303 of the casing part 302, with the flexibility of the connecting portion 264 being reduced by a radial weak zone 269 which is not illustrated in greater detail and which is located between the fixing portions 263, 265 and is aligned radially relative to the flange center. The shape of the fixing edges 268, 270 is adapted to the outer contour of the cylindrical portion 303, so that, in the direction of rotation, the flange part is form-fittingly secured to the casing part 302. At the fixing portions, there are arranged knobs 271, 272 in pairs which form a radial gap 273 relative to the cylindrical portion 303 during assembly, with a weld being produced in said radial gap.

The flange part 281 in FIG. 7a is shown to comprise two fixing portions 283, 285 which are each provided with a central fixing hole 286, 287. The shape of the connecting portion 284 connecting the two fixing portions is defined by an outer indentation 297 and inner adapting means 298 relative to the cylindrical portion 323 of the casing part 322, with the flexibility of the connecting portion 284 being reduced only by a weak zone 289 which is not described in greater detail, which is located between the fixing portions 283, 285 and which is aligned radially relative to the flange center. The shape of the fixing edges 288, 290 is adapted to the outer contour of the cylindrical portion 323, so that, in the direction of rotation, the flange part is form-fittingly secured to the casing part 322. The outer contour of the cylindrical portion 323 is provided with knobs arranged in pairs which form a radial gap relative to the flange part 281 during assembly, with a weld being produced in said radial gap.

Preferred embodiments have been disclosed. However, the claims should be studied to determine the true coverage of these inventions.

What is claimed is:

1. An outer joint part of a constant velocity universal joint comprising:

an externally cylindrical casing part having an inside surface provided with tracks to allow the engagement of torque transmitting elements, and a substantially annular flange part being a planar piece of plate metal with a constant thickness, said flange part provided with a central inner recess and which is slid on to the casing part and welded thereto, as well as provided with circumferentially distributed fixing holes for threading on a counter flange;

said flange part having circumferentially distributed, individual, separate fixing portions, which receive said fixing holes, and connecting portions which connect said fixing portions and have a greater flexibility than said fixing portions.

2. An outer joint part of a constant velocity universal joint comprising:

an externally cylindrical casing part having an inside surface provided with tracks to allow the engagement of torque transmitting elements, and a substantially annular flange part being a planar piece of plate metal with a constant thickness, said flange part provided with a central inner recess and which is slid onto the casing part and welded thereto, as well as provided with circumferentially distributed fixing holes for threading on a counter flange;

said flange part having circumferentially distributed, individual, separate fixing portions, which receive said fixing holes, and connecting portions which connect said fixing portions and have a greater flexibility than said fixing portions and wherein it is only in the region of said fixing portions where said flange part is welded to said casing part.

3. An outer joint part according to claim 2, wherein said inner recess of said flange part and a seat face of said casing part extend circularly at least in the regions of said fixing portions.

4. An outer joint part according to claim 2, wherein said connecting portions have a reduced radial dimension as compared to said fixing portions.

5. An outer joint part according to claim 2, wherein said connecting portions are provided with radial notches or broken-out regions.

6. An outer joint part according to claim 2, wherein said connecting portions are arranged at a radial distance from the casing part.

7. An outer joint part according to claim 2, wherein said connecting portions extend in a corrugated fashion relative to the circumferential direction.

* * * * *